US011965782B2

(12) United States Patent
Tomsia et al.

(10) Patent No.: US 11,965,782 B2
(45) Date of Patent: Apr. 23, 2024

(54) ADJUSTED COLOR PRESCRIPTIONS FOR AQUEOUS COATING COMPOSITIONS TO CORRECT GLOSS DIFFERENCES

(71) Applicant: Columbia Insurance Company, Omaha, NE (US)

(72) Inventors: Thomas P. Tomsia, East Stroudsburg, PA (US); Hugh S. Fairman, Stillwater, NJ (US); Christopher Sanders, Albrightsville, PA (US)

(73) Assignee: Columbia Insurance Company, Omaha, NE (US)

( * ) Notice: Subject to any disclaimer, the term of this patent is extended or adjusted under 35 U.S.C. 154(b) by 348 days.

(21) Appl. No.: 17/259,977

(22) PCT Filed: Nov. 18, 2019

(86) PCT No.: PCT/US2019/061961
§ 371 (c)(1),
(2) Date: Jan. 13, 2021

(87) PCT Pub. No.: WO2020/117460
PCT Pub. Date: Jun. 11, 2020

(65) Prior Publication Data
US 2021/0270672 A1 Sep. 2, 2021

Related U.S. Application Data (60) Provisional application No. 62/774,920, filed on Dec. 4, 2018.

(51) Int. Cl.
*G01J 3/46* (2006.01)
*G01N 21/57* (2006.01)

(52) U.S. Cl.
CPC ............... *G01J 3/465* (2013.01); *G01J 3/463* (2013.01); *G01N 21/57* (2013.01); *G01J 2003/466* (2013.01)

(58) Field of Classification Search
CPC ...... G01J 2003/466; G01J 3/463; G01J 3/465; G01N 2021/473; G01N 21/25; G01N 21/57
(Continued)

(56) References Cited

U.S. PATENT DOCUMENTS 6,018,396 A    1/2000  Rapaport et al.
2003/0090555 A1 *  5/2003  Tatsumi ................. B41J 2/2114
                                                        347/101

(Continued)

OTHER PUBLICATIONS

International Search Report and Written Opinion issued in connection with the corresponding International Application No. PCT/US2019/061961 on Mar. 5, 2020.

*Primary Examiner* — Sunghee Y Gray
(74) *Attorney, Agent, or Firm* — The H.T. Than Law Group (57) ABSTRACT

Described herein is a process for correcting an observed color difference between a color at a first gloss and the color at a second gloss different than the first gloss, said process comprising the steps of: (a) determining a first correction caused by a lightness (Y-value) of the color a first gloss; (b) determining a second correction caused by an inclusion of a first surface diffusion in gloss readings; (c) based on the first and second corrections, determining a specular correction caused by a difference in specular reflections from the color at the first gloss and the color at the second gloss; (d) determining tristimulus corrections based on the specular correction; (e) preparing corrected tristimulus values of the color at a second gloss; and (f) producing a paint composition for the color at the second gloss using the corrected tristimulus values.

20 Claims, 1 Drawing Sheet

(58) Field of Classification Search
USPC .......................................................... 356/405
See application file for complete search history.

(56) References Cited

U.S. PATENT DOCUMENTS

| | | |
|---|---|---|
| 2006/0256341 A1 | 11/2006 | Kuwada et al. |
| 2007/0289705 A1 | 12/2007 | Johnson et al. |
| 2009/0289940 A1* | 11/2009 | Kimura ................. G06T 15/80 |
| | | 345/426 |
| 2012/0294635 A1* | 11/2012 | Yano ................. G03G 15/0189 |
| | | 399/39 |
| 2014/0327912 A1 | 11/2014 | Kettler et al. |

* cited by examiner

ADJUSTED COLOR PRESCRIPTIONS FOR AQUEOUS COATING COMPOSITIONS TO CORRECT GLOSS DIFFERENCES

FIELD OF THE INVENTION

The present invention derives adjusted color prescriptions for aqueous coating compositions at different glosses, so that the dried films formed by such aqueous coating compositions would appear to be the same color to consumers and other observers, although the dried paint films may have different tristimulus values. The present invention is also related to a method for matching dried paint films or color merchandise to appear to be the same color to observers to account for the color differences caused by the differences in gloss values.

BACKGROUND OF THE INVENTION

Paints are sold in various glosses, such as flat/matte, eggshell, satin, semi-gloss and gloss. Consumers as well as color experts have observed that paints sold as having the same color and at different gloss form the paint films that have colors that appear to be different from each other. For example, a consumer may paint a matte or flat finish of color A for the walls and a semigloss finish of the same color A for door and window frames and for the floor trims. If the tristimulus values of these two colors were identical, the consumer would notice that the wall color is noticeably different than the color of the frames and floor trims.

The consumer would most likely have obtained a color chip that represents color A at a paint store before purchasing paints that are tinted to color A in multiple glosses. That color chip was made based on a color standard for color A. Color standards are standard color chips that are accurately made and are preserved so that paint compositions and other color merchandise or color chips can be compared later. These color standards are preserved away from sunlight and are made with non-reactive substrate backings to preserve the colors. Generally, color standards are made using a single finish or gloss for simplicity and consistency. In one instance, the selected finish for the color standards is eggshell, which has about 10-25 gloss units (GU) at 60°, for one paint company. Hence, the color chip for color A available for the consumer would be in eggshell finish. However, as explained below, color chips or paint films that have different finishes or glosses would not appear to be color matched to viewers, even though they have similar or same tristimulus values.

Tristimulus values of colors or color standards, such as those measured on the CIEL*a*b*, CIEL*c*h, CIEUVW or CIEXYZ systems, and/or their spectral reflectance over the visible range of the electromagnetic spectrum are measured and stored to describe the color standards. Tristimulus color systems are described in commonly owned U.S. Pat. No. 9,123,149 issued to P.T.F. Chong and H. Fairman, which is incorporated herein by reference in its entirety. The tristimulus data and spectral reflectance data for color standards are typically stored digitally, and aqueous paint compositions, as well as, color merchandise is produced according to these stored data.

As used herein, color merchandise includes color chips of any size, fan decks or color palettes comprising color chips. Color merchandise includes both singular and plural form. The gloss or the finish of a dried paint surface of a color merchandise indicates the level of shininess or glass-likeness of the surface. The level of gloss ranges from flat/matte to high gloss. The gloss of a surface has been described as the reflection of light from the surface that is purportedly independent of colors. To measure gloss, a single beam of light from the light emitter is incident on the surface at a particular angle and its specular reflection is received by a receptor positioned at the same angle as the incoming beam of light, as discussed in http://x wxvx.paintinfo.com/mpi/approved/sheen.shtml and ASTM method D 523, which are incorporated herein by reference in their entireties. The receptor gauges the intensity of the reflected light in gloss units. The gloss meter according to D523 is standardized or calibrated with specially produced, polished, black glass or ceramic tiles with a refractive index of 1.567 for the sodium D line (589 nm wavelength). Specular reflection off of this standardized tile is given a value of 100 gloss units (GU). Specular reflections off of other surfaces are measured relative to the specular reflection off of the standardized tile. ASIM method D 523 provides the procedures for performing this gloss test.

ASTM method D 523 uses 60° angle for comparing surface glosses and to determine whether other angles such as 20° and 85° are warranted. The 20° angle is used when the surface sample has a 60° gloss value greater than 70 gloss units, and the 85° is used if the 60° gloss value is less than 30 gloss units. The angle is measured from a vertical axis, e.g., a 60° angle is measured from the vertical line or the 0° line, and the 60° angle is 30° above the surface being tested.

Commonly, the term sheen is used to describe the low angle gloss, e.g., 85° from vertical or 5° above the surface to be measured. The 85° angle is preferred in measuring low gloss coatings and is generally a more accurate indicator of the transition between flat and eggshell. Steep angles, such as 20°, are more often used with a high gloss surface such as automotive exterior body enamel. As used herein, gloss and sheen have the same or similar meaning and can be used interchangeably.

The Master Paint Institute (MPI) categorizes the gloss finishes of paints as follows: TABLE, The Reflectivity of Paints with Different Gloss at Different Angles

| Type of Paint Finish | 20° Gloss | 60° Gloss | 85° Gloss |
|---|---|---|---|
| High Gloss | 20-90 | 70-85+ | — |
| Semi-Gloss | 5-45 | 35-70 | — |
| Satin | — | 20-35 | min. 35 |
| Eggshell | | 10-25 | 10-35 |
| Flat/Matte | | 0-10 | max. 35 |

Higher gloss values (Gi) indicate shinier painted surfaces.

As discussed in http://www.paintinfo.com/mpi/approved/sheen.shtml, the gloss level of a coating is affected by its surface roughness. The protrusion of pigment or extender particles through the binder layer causes diffraction of light and gives the coating a dullness. Where the pigment or extender particles are covered by the binder layer, the coating surface is smoother and light incident at an angle is readily reflected. The gloss or reflected light can influence the visual color of a surface when viewed from various angles. This can be seen when coating compositions tinted to the same color but with different finishes or gloss levels are applied side-by-side on the same substrate.

Furthermore, when color chips having the same tristimulus values, but different glosses are viewed under the same illuminant with the viewers holding the color chips at angle that points the specular reflection away from the viewers' field of view (FOV) to avoid seeing white light or white wash, the colors on the color chips appear to be different. For example, two chips with identical tristimulus values but in an eggshell finish and a semi-gloss finish when viewed under the same illuminant would appear to be different colors. The same effect can be seen on walls painted with the same color but in different glosses.

However, recognizing this color difference on 2-D color chips or on a painted surface in homes and offices tinted to the same color but at different gloss levels heretofore has not led to compensating for this color difference. These gloss-induced color differences remain challenging particularly for consumers to comprehend. I-fence, there remains a need to tint paints at different glosses so that the paint films viewed by consumers would appear to be the same color notwithstanding the differences in glosses or finishes.

SUMMARY OF THE INVENTION

In a preferred embodiment, when a consumer chooses a color that the paint compositions are to be tinted and a target gloss value, e.g., from 0 to 85+ at 60°, as shown on the MPI table above, the present invention utilizes the tristimulus values of the color standard of that color and the stored gloss value for that color standard and adjust the tristimulus values so that the paint film formed from the tinted paint compositions at the target gloss value would be color matched to the color that the consumer selected.

In another embodiment, the present invention allows the consumers to avoid the imprecise wording used to describe the different glosses and sheens, such as matt/flat, eggshell, satin, semi-gloss, which have overlapping ranges of GU values and uneven (GU value ranges for the different level of glosses. The consumers can select a more precise gloss by indicating the desired numerical GU values at a specific angle for the paints to be purchased and the purchased paints would produce paint films that color match the color of the color chips that the consumers viewed at the paint stores.

In a preferred embodiment, when a color, e.g., a color standard with known tristimulus values, at a first or known gloss is available and the same color at a different second gloss is desired, the inventive method described herein uses the known tristimulus, the known first gloss and the desired second gloss and calculates a false/new tristimulus values for the color sample at the second gloss, such that there is no observed color difference between the color at the first gloss and the color at the second gloss. The color at the first gloss can be the color standards with known tristimulus values, e.g., CIEXYZ values, and known gloss, and the color at the second gloss can be the color of the paint films formed from tinted paint compositions at the second gloss.

One embodiment of the present invention is directed to a process for correcting an observed color difference between a color at a first gloss and the color at a second gloss different than the first gloss, said process comprising the steps of:

(a) determining a first correction caused by a lightness (Y-value) of the color a first gloss;
(b) determining a second correction caused by an inclusion of a first surface diffusion in gloss readings;
(c) based on the first and second corrections, determining a specular correction caused by a difference in specular reflections from the color at the first gloss and the color at the second gloss;
(d) determining tristimulus or spectral corrections based on the specular correction;
(e) preparing corrected tristimulus values of the color at a second gloss; and
(f) producing a paint composition for the color at the second gloss using the corrected tristimulus values, or a color merchandise for the color at the second gloss using the corrected tristimulus values.

Step (a) may comprise step (a1) of ascertaining a lightness correlation between gloss values of a first reference color and a reference second color, wherein the first reference color has a lower Y-value than the second reference color. The first reference color can be a black color, and the second reference color can be a white color. The lightness correlation may be a linear regression between the gloss values of the black color and the white color, $(GU)_{wh}=m_1 \cdot (GU)_{b1}+b_1$.

Step (a) may further comprise step (a2) of determining a gloss correction coefficient (GCC) to generalize the lightness correlation. The GCC can be $$GCC = \left(\frac{90 - Ystd}{90}\right) \cdot \text{(lightness correlation)},$$

wherein $Y_{std}$ is the Y-value of the color at the first gloss.

Step (b) may comprise step (b1) of ascertaining a gloss value-specular reflection correlation between the gloss values and the specular reflections of a reference color. The reference color may be a white color. The gloss value-specular reflection correlation can be a linear regression between the gloss values and specular reflections, $R_{SPwh}=m_2 \cdot (GU)_{wh}+b_2$.

The specular correction in step (c) can be determined by $R_{SP}=m_2 \cdot (GCC)+b_2$, wherein $R_{SP}$ is the specular reflection, wherein $m_2$ and $b_2$ are coefficients from a linear regression between the gloss values and the specular reflection of a reference color, wherein CCC is the $$\text{gloss correction coefficient} = \left(\frac{90 - Ystd}{90}\right) \cdot \text{(lightness correlation)},$$

wherein $Y_{std}$ is the Y-value of the color at the first gloss, and wherein the lightness correlation comprises $(m_1 \cdot GU_{specimen}+b_1)$, wherein $m_1$ and $b_1$ are coefficient from another linear regression between the gloss values of black and white and $GU_{specimen}$ is the gloss value of the first gloss or the second gloss.

The specular correction in step (c) is preferably equaled to Δ $R_{SP}$, wherein $\Delta R_{SP}=\{R_{SP}(\text{the color at the second gloss})-R_{SP}(\text{the color at the first gloss})\}$.

The tristimulus correction in step (d) can be determined by $$R_C = \frac{T_i}{100}\Delta R_{sp},$$

wherein $T_1$ comprises the tristimulus values of a white point of an illuminant-observer standard. The illuminant-observer standard is preferably D65/10'°

The spectral correction in step (d) is determined by adding Δ $R_{SP}$ to each element of the spectrum data of the color at a first gloss to produce corrected spectrum data and the corrected tristimulus values is calculated based on the corrected spectrum data.

In one embodiment, the specular correction in step (c) is determined by an equation $$R_{SP} = 0.0453 \bullet \left\{ \left( \frac{90 - Y_{standard}}{90} \right) (1.10(GU)_{specimen} + 1.27) \right\} + 0.1892$$

wherein $Y_{standard}$ is the Y-value of the color at the first gloss, wherein $GU_{specimen}$ is the gloss value of the first gloss or the second gloss, and wherein numerical values in said equation for the specular correction can vary within a range of ±15%, preferably within a range of ±1:10% or preferably within a range of 5%. The color at the first gloss can be a color standard. The first gloss can be measured or known from the color standard and the second gloss is preferably selected by a consumer.

Another embodiment of the present invention is directed to a gloss measuring instrument to measure a gloss value of a substrate comprising an incident light source sized and dimensioned to incident on the substrate, a photodetector positioned to receive a reflected light from the substrate, and a means for adjusting a gloss reading based on a lightness value of a color of the substrate, as described herein,

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

When consumers purchase paints or aqueous paint compositions, they typically choose the paint colors by viewing color merchandise such as color chips of varying sizes, fan decks, etc. The color merchandise is manufactured in accordance to the color standards that are securely kept by paint manufacturers. Typically, the tristimulus values of color of the color standards, as well as the spectral reflectance values, are maintained.

As discussed above, color standards are typically set at a chosen gloss. At least one prominent paint manufacturer selected eggshell, whose gloss value ranges from about 10 to about 25 GU, to be the gloss of its color standards. Eggshell is located in the mid-range of the conventional gloss values for paints and other architectural coatings, which range from about 0-60 GU at 60° for most paints or from flat to semi-gloss. Other paint manufacturers could have selected other gloss(es) for their color standards.

When a light beam is incident on a painted surface, the reflected lights have at least three components. One component is the specular reflection or directional reflection which is captured by the receptor sensor in the gloss meter and reported as gloss values in GU.

The second reflection is the first surface diffusion, which is the non-directional diffused reflection. The term, first surface diffusion, is derived from general optics, which refers to the first surface of a lens that a light beam encounters. The second surface is the opposite surface of the lens that the light beam exits. The second surface would be analogous to the bottom surface of the paint film adjacent to the substrate and is not pertinent to opaque or colored paint films. As discussed below, some of the first surface diffusion within the gloss meter's receptor sensor's FOV is also captured by the gloss meter. It is an accepted approximation from Fresnel principles that for an air-glass interface (index of refraction $n_{air}=1$; $n_{glass}=1.5$) the first surface diffusion and the specular reflection components make up about 4% of the total incident light and about 96% of the energy of the incident light goes into the paint film. This approximation holds for gloss measurements.

The third reflection is termed the body color reflection, which includes light that enters the paint film. Some of which is absorbed by the paint film or transmitted through the paint film, and some is reflected back.

According to the Fresnel principles, for incident lights with the same intensity the total reflectance from a color standard at the chosen gloss is the same as the total reflectance from color merchandise (including the merchandise at the same hue) at a different gloss. Expressed in equation form, this principle yields the following equations:

Standard: $1^{st}$ surface diffuse+body color diffuse+ specular=total reflection Merchandise: $1^{st}$ surface diffuse+body color diffuse+ specular=total reflection Since Fresnel predicted that the combination of specular reflection and first surface diffuse reflection is about 4% of the total reflection from a single incident light, thus 4%·total reflection (standard)=4%·total reflection (merchandise)

$1^{ST}$ surface diffuse$_{st}$+specular$_{st}$=$1^{st}$ surface diffuse$_{mer}$+specular$_{mer}$ $1^{st}$ surface diffuse$_{st}$−$1^{st}$ surface diffuse$_{mer}$=specular$_{mer}$−specular$_{st}$ $1^{st}$ surface diffuse$_{st}$−$1^{st}$ surface diffuse$_{mer}$=−{specular$_{t}$−specular$_{mer}$} or     (0)

$\Delta 1^{st}$ surface diffuse=−$\Delta$specular reflection

In other words, the color differences viewed by the observers are related to or preferably equal to the negative of the differences in the specular reflection.

Hence, the difference between the first surface diffusion of the standard and the merchandise is equal to the negative of the difference between the specular reflection of the standard and the merchandise. As discussed above, when an observer views color samples having the same hue/tristimulus values but different glosses at an angle that avoids specular reflection, the observer would see the first surface diffusions and would see a color difference even though the samples have the same hue/tristimulus values. This color difference is related to the differences in specular reflections caused by the different glosses.

In addition to the differences in gloss among the color merchandise, it is known that the colors or hues of the merchandise can affect the absorption and reflection of light, discussed above as the body color reflection. For example, it is known that black colors absorb more light and other radiations than lighter or white colors, and thereby reflect less. The incident light beam emitted from the gloss meter is generally a white or near white light, which has components in the visible electromagnetic spectrum varying from red to blue and violet with yellow, orange, green and multiple variations in between. Blue and violet have shorter wavelengths (~400 nm) and higher energy, and red wavelengths (~700 nm) have longer wavelengths but have lower energy.

For example, a red surface absorbs yellow, green, blue and violet lights while reflecting red light. A green surface absorbs all colors except green. A white surface, which is a combination of all colors, reflects light at all wavelengths. A black surface is the least reflective color and absorbs lights at all wavelengths. A surface color that is closer to white, e.g., pastels and off-whites, reflects more light. Deep tones reflect less light. Adding white to a color also known as tinting increases the color's reflection; adding black to a color also known as shading decreases the color's reflection. Hence, in another embodiment preferably adjusting color merchandise for gloss differences should also include adjustments for absorption/reflection by the whiteness of the colored paint surfaces.

The present inventors have discovered an inventive method to correct the apparent or false color differences between color merchandise and color standards having the same color/tristimulus values but different glosses and different whiteness by adjusting the tristimulus values of the color standards when making the color merchandise, Adjusting the tristimulus value(s) can account or compensate for the gloss-induced color differences, as shown below.

To perform the inventive method, the gloss reading (GU) of a color standard is obtained either from the maintained database or digital library or by using a specific gloss meter. If a gloss meter is used, preferably the same gloss meter is used throughout the inventive process.

Generally, many commercial instruments capable of measuring gloss are available including but not limited to the BYK 60° gloss meter, the i5 hemispherical color spectrophotometer and the 45°/0° X-Rite MetaVue spectrophotometer, and others. The gloss reading of a color merchandise is also obtained.

The tristimulus CIEXYZ values of the color standard are also obtained, preferably from the digital library that maintains this information or alternatively by measuring with any of the available color spectrophotometers, such as those available from X-Rite. The CIEXYZ tristimulus color space was created by the International Commission on Illumination (CE) in 1931. The Y-value is associated with the luminance of a color, and theoretically can range from 0 to 100, with Y=0 being the darkest black and Y=100 being the whitest color. Y-value of the CIEXYZ space is used in the inventive method to adjust for the whiteness in a color merchandise, discussed above, Preferably, the X-value and the Z-value are not needed in this portion of the method, and are used later. Other tristimulus color space discussed in the '149 patent that has a lightness component (L), such as CIEL*a*b* or CIEL*C*h, can alternatively be used.

The GU value for the color merchandise, which would be different from the GU of the color standard, is measured. The tristimulus values of the color merchandise would be the same as those for the color standard. In one example, a GU value on the 60° Gloss scale is measured.

The present inventors have discovered that the aqueous paint compositions whose bases are the same in substantially every way but are tinted to different colors should have the same gloss values (GU) when dried to form paint films in fact do not have the same gloss values. The gloss values are lower in black paints than in white paints. The present inventors prepared several sets of eleven draw-downs of paint films having a thickness of about 3 mils in various glosses at 60° ranging from 0 to 60 GU. One set of draw-downs used black paints; another set used white paints. A flat paint is mixed with a semi-gloss paint in various proportions to produce 11 mixed paints with varying glosses. Each member of a set has a corresponding member in the other set, where both corresponding members have the same mixture of flat and semi-gloss paints. Hence, but for the differences in tinted colors their drawdowns should register the same gloss value on the gloss meter. As shown below in Table 1, gloss readings were taken for each draw-down. A BYK 60° gloss meter is used for these measurements.

TABLE 1

| | Measured Gloss Values (GU) | |
|---|---|---|
| | Black Paints | White Paints |
| 1 | 51.2 | 57.7 |
| 2 | 31.5 | 35.5 |
| 3 | 20.1 | 22.9 |
| 4 | 13.8 | 16.3 |
| 5 | 9.8 | 12.2 |
| 6 | 7.3 | 9.3 |
| 7 | 5.3 | 7.2 |
| 8 | 4.1 | 5.7 |
| 9 | 3.1 | 4.7 |
| 10 | 2.3 | 3.9 |
| 11 | 1.8 | 3.3 |

Figure 1:
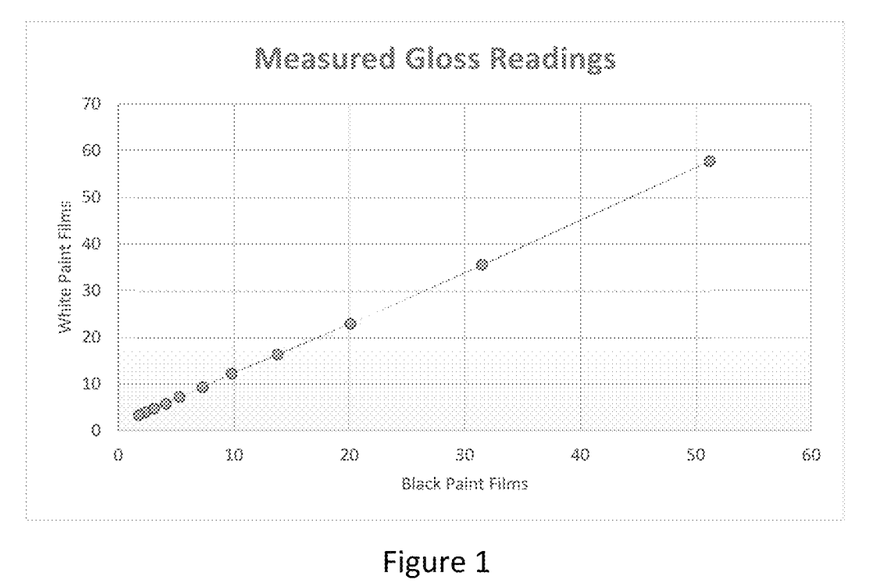
FIG. 1 is a graph showing the measured gloss values by a gloss meter of black paints versus white paints wherein the black and white paints have corresponding glosses.

The only significant difference between the two sets of paints is the color of the paints. The amount of film-forming resins is the same for each of the corresponding samples and should have produced paint films with the same gloss readings. An X-Y plot of the measured glosses of black paints versus white paints is shown in FIG. 1. This plot shows that the relationship between the measured gloss values is substantially linear and would statistically fit in a classic linear regression equation (y=mx+b) as follows.

$$(GU)_{wh} = m_1 \cdot (GU)_{b1} + b_1, \quad (1)$$

where $m_1=1.10$ and $b_1=1.27$ for this experiment, or $$(GU)_{wh} = 1.10 \cdot (GU)_{b1} + 1.27 \quad (1.1)$$

To test the accuracy of Equation (1), Table 2 compares the predictive gloss values of $GU_{wh}$ of Equation (1) versus the measured $GU_{wh}$. As shown in the difference column ($\Delta GU$), Equation (1) is highly predictive of the measured $GU_{wh}$.

TABLE 2

| | Measured Gloss Values (GU) | | | |
|---|---|---|---|---|
| | Black Paints | White Paints | Predictive | Δ GU |
| 1 | 51.2 | 57.7 | 57.6 | −0.1 |
| 2 | 31.5 | 35.5 | 35.9 | 0.4 |
| 3 | 20.1 | 22.9 | 23.4 | 0.5 |
| 4 | 13.8 | 16.3 | 16.5 | 0.2 |
| 5 | 9.8 | 12.2 | 12.1 | −0.1 |
| 6 | 7.3 | 9.3 | 9.3 | 0.0 |
| 7 | 5.3 | 7.2 | 7.1 | −0.1 |
| 8 | 4.1 | 5.7 | 5.8 | 0.1 |
| 9 | 3.1 | 4.7 | 4.7 | 0.0 |
| 10 | 2.3 | 3.9 | 3.8 | −0.1 |
| 11 | 1.8 | 3.3 | 3.3 | 0.0 |

The present inventors have also found that the values of $m_1$ and $b_1$ can vary as much as about 15%, preferably about ±10% or preferably about ±5%. For example, if the values of m1 and m2 can vary ±10%, then $m_1$ can be from about 1.0 to about 1.2 and $b_1$ can be from about 1.14 to about 1.40. The correlations between GU values between black and white remain acceptable within these ranges.

FIG. 1 and Equation (1), as well as Tables 1 and 2, show that the difference in gloss values caused by the whiteness of the paints is significant and should be addressed. Since Equation (1) expresses the gloss value relationship between black and white paints and most tinted paints are darker than white or have less lightness, which is measured on the Y-axis of the CIEXYZ tristimulus coordinate, Equation (1) is modified by a correction factor to adjust the gloss value for colors or color merchandise other than white. The present inventors derived a gloss correction coefficient (GCC) by introducing a lightness factor, as shown below.

$$GCC = \left(\frac{90 - Y_{std}}{90}\right)(m \bullet (GU)_{mer} + b), \quad (2)$$

or for this experiment $$GCC = \left(\frac{90 - Y_{std}}{90}\right)(1.10(GU)_{mer} + 1.27) \quad (2.1)$$

Hence, if $Y_{std}$ or the lightness of the color standard approaches 0 then the color standard is black, and this lightness factor is 1 (90÷90), and GCC has its highest corrective value. If $Y_s$td approaches 90 then the color standard is white, and this factor is 0 (0÷90), and the GCC is 0 and no correction is needed. If $Y_{std}$ is greater than 90 (and less than the maximum value of 100), then $Y_{std}$ is set to 90. Very few color standards, if any, have a Y-value greater than 90.

The gloss meter's readings according to ASTNM D523 shown in Tables 1 and 2 include specular reflection; however, the receiving sensor in the gloss meter would also read an amount of diffused reflection that is in its FOV. Hence, the specular reflection component and the diffused reflection component should be separated. Another instrument known as a hemispherical spectrophotometer, such as the i5 or i7 hemispherical spectrophotometer commercially available from X-Rite Corp. is capable of measuring the reflectance including the specular reflection ($R_{SPin}$) and the reflectance excluding the specular reflection ($R_{SPex}$). Subtracting these two reflectance values ($R_{SPin}$-$R_{SPex}$) would yield the specular reflectance in units of reflectance.

Reflectance or albedo is the ratio of incident luminous flux upon a surface which is reradiated in the visual spectrum. Diffuse reflectance is the ratio of the flux reradiated by diffuse reflection. Unlike gloss units (GU) which range from 0-100 and which are the reflectance off a surface relative to the reflectance off a standardized black tile, unit of reflectance is percent (% R) or a decimal fraction between 0 and 1.

The specular reflectance values were measured for the black and white paint samples shown in Table 1. Table 3 below reports the measured specular reflectance.

TABLE 3

| | Measured Specular Reflectance (% R) | |
|---|---|---|
| | Black Paints | White Paints |
| 1 | 2.43 | 2.63 |
| 2 | 1.68 | 1.96 |
| 3 | 1.16 | 1.39 |
| 4 | 0.8 | 1.00 |
| 5 | 0.57 | 0.76 |

TABLE 3-continued

| | Measured Specular Reflectance (% R) | |
|---|---|---|
| | Black Paints | White Paints |
| 6 | 0.38 | 0.59 |
| 7 | 0.27 | 0.49 |
| 8 | 0.19 | 0.40 |
| 9 | 0.16 | 0.35 |
| 10 | 0.15 | 0.31 |
| 11 | 0.14 | 0.28 |

The present inventors elected to compare the gloss measurements and the specular reflection measurements for white paints to conduct a comparison between the measured gloss and the measured specular reflectance. It is noted that this comparison may also be conducted with black paints, where the data is included in Tables 1 and 3. Furthermore, this comparison can also be conducted using any color including various shades of grays, and the present invention is not limited to any specific color selected to conduct gloss correction.

Table 4 below shows the measured gloss and measured specular reflectance for white paints.

TABLE 4

| | Meas(GUw) | Meas(RSPw) (%R) |
|---|---|---|
| 1 | 57.7 | 2.63 |
| 2 | 35.5 | 1.96 |
| 3 | 22.9 | 1.39 |
| 4 | 16.3 | 1.00 |
| 5 | 12.2 | 0.76 |
| 6 | 9.3 | 0.59 |
| 7 | 7.2 | 0.49 |
| 8 | 5.7 | 0.40 |
| 9 | 4.7 | 0.35 |
| 10 | 3.9 | 0.31 |
| 11 | 3.3 | 0.28 |

Figure 2:
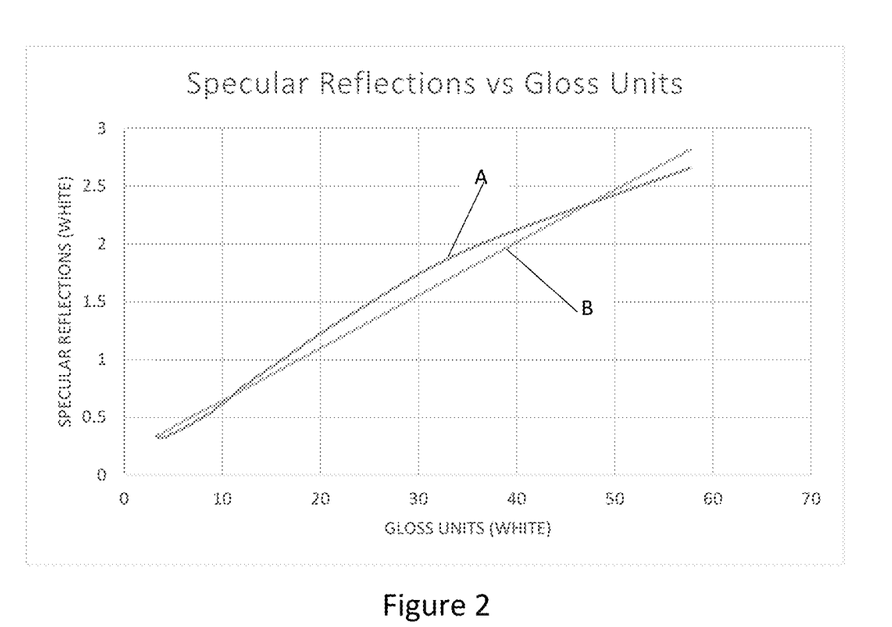
FIG. 2 is a graph showing the measured specular reflections versus measured gloss for white paints.

FIG. 2 shows the plot of measured specular reflections versus measured gloss as curve A. As regression analysis, preferably a linear regression, is performed on the data in FIG. 2, which yields linear curve B ($y_2=m_2x+b_2$), as follows:

$$R_{SPwh} = m_2 \cdot (GU)_{wh} + b_2 \quad (3)$$

with $m_2=0.0453$ and $b_2=0.1892$, or for this experiment $$R_{SPwh} = 00453 \cdot (GU)_{wh} + 0.1892 \quad (3.1)$$

To test the accuracy of Equations (3) and (3.1), Table 5 compares the predictive specular reflectance values of $R_{SP}$ w of Equation (3.1) versus the measured $R_{SPwh}$. As shown in the difference column (Δ), Equation (3) is highly predictive of the measured $R_{SPwh}$.

| | Measured White Paints | | | |
|---|---|---|---|---|
| | Meas(GUw) | Meas(RSPw) | Predicted(RSPw) | Δ specular |
| 1 | 57.7 | 2.63 | 2.80 | 0.17 |
| 2 | 35.5 | 1.96 | 1.80 | −0.16 |
| 3 | 22.9 | 1.39 | 1.23 | −0.16 |
| 4 | 16.3 | 1.00 | 0.93 | −0.07 |
| 5 | 12.2 | 0.76 | 0.74 | −0.02 |
| 6 | 9.3 | 0.59 | 0.61 | 0.02 |
| 7 | 7.2 | 0.49 | 0.52 | 0.03 |
| 8 | 5.7 | 0.40 | 0.45 | 0.05 |
| 9 | 4.7 | 0.35 | 0.40 | 0.05 |

-continued

Measured White Paints

| | Meas(GUw) | Meas(RSPw) | Predicted(RSPw) | Δ specular |
|---|---|---|---|---|
| 10 | 3.9 | 0.31 | 0.37 | 0.06 |
| 11 | 3.3 | 0.28 | 0.34 | 0.06 |

The present inventors also found that the values of $m_2$ and $b_2$ can vary by about ±15%, preferably ±10% or preferably ±5%, similar to the values of $m_1$ and $b_1$, discussed above.

Since the color merchandise or painted substrates would not always be white, equations (3) and (3.1) are generalized to include color merchandise or painted substrates of any color having a lightness component (e.g., Y-value). GCC from equation (2) or more specifically equation (2.1) for the selected white paints.

$$R_{SP} = m_2 \cdot GCC + b_2 \quad (4)$$

with $m_2=0.0453$ and $b_2=0.1892$ for this experiment $$R_{SP} = 0.0453 m(GCC) + 0.1892 \quad (4.1)$$

substituting equation (2.1) for GCC in equation (4.1) yields $$R_{SP} = 0.0453 \bullet \left\{ \left( \frac{90 - Y_{standard}}{90} \right) (1.10(GU)_{specimen} + 1.27) \right\} + 0.1892 \quad (4.1.1)$$

The numerical values in equation (4.1.1) including scalar/multiplier and offsets can vary as much as ±15%, preferably ±10% and more preferably 5%, and the color matching remains in the acceptable range, discussed above, The specular reflection component is then calculated for both the color standard and the color merchandise that should have the same color with different glosses but have an apparent or false color difference. The gloss value of the standard and the gloss value of the merchandise is inserted for the $GU_{specimen}$, respectively, and the Y-value of the standard is known or can be measured, as discussed above. As shown in Equation (0), the difference in the specular reflections is related to or preferably is equal to the perceived or false color differences between the color standard and the color merchandise. This specular correction is shown below.

$$\Delta R_{SP} = R_{SP}(\text{merchandise}) - R_{SP}(\text{standard}). \quad (5)$$

It is noted that $\Delta R_{SP}$ may be a negative value.

The correction Re for each of the three tristimulus values is expressed as follows, $$R_C = \frac{T_i}{100} \Delta R_{spec} \quad (6)$$

$R_c$ is the tristimulus value correction in percent reflectance units. $T_i$ is the tristimulus values of the white point under consideration. This white point is the tristimulus values of the illuminant-observer combination and varies over the range of illuminant-observer combinations. The determination of the illuminant-observer combination is summarized in "Understanding CIE Illuminants and Observers 12" available on https://measurewhatyousee.com/2014/10/10/understanding-cie-illuminants-and-observers/. This article and the sources cited therein are incorporated herein by reference in their entireties.

As described in the article, the Commission Internationale de L'Eclairage (International Commission on Illumination) or CIE in 1931 knew that most of the color cones in the human eyes were located in a small area at the back of the eye within a 2° angular subtense in the fovea of the retina. In 1931, the angle of viewing was limited to this 2° angle standard observer. In 1964, the standard observer was supplemented by the addition of a 10° angle observer because it was realized that most human observations of color subtend an angle larger than 2°. The widely used standard illuminants are the D-illuminants, which are natural daylights and are named for the color temperature that they emulate. For example, D50 emulates light with a color temperature of 5000° K; D55 emulates mid-morning light with a color temperature of 5500° K; D75 corresponds to north sky daylight at 7500° K. In the paint or architectural coating industry, D65, which emulates noon daylight with a color temperature of 6500° K, is typically used as the standard illuminant with a 10° standard observer. On the other hand, the printing industry and the graphics industry typically use D55/20.

ASTM Standard Practice E308 for Computing the Colors of Objects by Using the CIE System cites two different observers and nine different standard illuminants. As such, there are as many as eighteen different illuminant-observer standard combinations that could be chosen. The present invention is not limited to any particular illuminant-observer standard. A preferred standard is D65/10°, although other(s) may be used.

As described in this standard, standard illuminants are typically shown as spectral power distribution curves with the vertical axis showing the power values and with wavelengths in the visible range of the electromagnetic spectrum (~400-750 nm) on the horizontal axis. The D-standards are white lights, and the tristimulus values of D65/10' are X=94.811, Y=100.00 and Z=107.304. Tristimulus values of white points can go over 100 if there is more energy in the blue primary than in the green primary. The green primary is normalized to 100 and that forces the blue primary to be higher than 100. The tristimulus values of D65/2° are X=95.047, Y=100.00 and Z=108.883. (See https://en.wikipedia.org/wiki/Illuminant_D65, and references cited therein.)

Since the tristimulus values $T_i$ range from 0 to higher than 100, and the $T_i$ value associated with Y is conventionally normalized to 100. This means that the correction Re must be normalized to each element of $T_i$ so that the correction $R_c$ would also be expressed in 0 to 100 range. Hence, Re has derived Xc-, Ye- and Ze-components, and these components are added to the X-, Y- and Z-components of the color standard, respectively. This corrects each stimulus value of the color merchandise with a gloss value that is different than the gloss value of the color standard to a number that would color match the color merchandise to the human observers who discount this amount of reflected light since it is specularly reflected. The resultant X-, Y- and Z-components of the color merchandise is the target stimulus values for the gloss-corrected, color-matched painted substrates or color merchandise.

In another embodiment, the final correction $\Delta R_{SP}$ calculated at the end of (Eq. 5) could be added to each element of the spectral data of the standard color with later tristimulus integration of the corrected spectrum calculating the corrected tristimulus values. Such action would determine tristimulus values substantially the same as those obtained by correcting the tristimulus values as outlined above.

In a more generalized and preferred embodiment, when a color at a first or known gloss, e.g., a color standard with known tristimulus values, is available and the same color at a different second gloss is desired, the inventive method described herein uses (i) the known tristimulus of the color, (ii) the known first gloss and (iii) the desired or selected second gloss and calculates a false/new or corrected tristimulus values for the color at the second gloss, such that there is no observed color difference between the color at the first gloss and the color at the second gloss. The false/new or corrected tristimulus values would be different from the first or known tristimulus values.

Hence, according to an embodiment of the present invention, the present inventors have invented a method to calculate what components would be specularly reflected by the gloss difference and then adding/subtracting these components according to its sign (+/−) to establish a false target which would appear to the observers to color match to the color standard. The present inventors take the XYZ tristimulus values of the color standard at the selected gloss, e.g., eggshell as discussed above, and using the tristimulus R, correction to calculate a false XYZ tristimulus values for color merchandise at different gloss level that would be viewed as having the same color as the color standard at the selected gloss, as shown herein.

According to a preferred embodiment of the present invention, the inventive method is used to derive adjusted color prescriptions, e.g., a combination of color pigments, to tint paints or paint compositions to a paint color that have a gloss that is different than the gloss of the color standard maintained for that paint color. As tinted in accordance to the present invention, the paints would form dried paint films that would have matching paint color for different gloss or sheen. The dried paint films would have different tristimulus values.

According to another embodiment of the present invention, this inventive method can also be used to produce color merchandise that have different gloss levels than the color standards. The inventive color merchandise would have corrected tristimulus values different than those of the color standard but would appear to the observers/viewers/purchasers to have colors that are color matched to the color standard, as shown herein.

The following examples illustrate the inventive method for color matching color merchandise to color standards having different glosses and the inventive color matched color merchandise.

EXAMPLE 1

A medium brown color in a semi-gloss finish is matched to its standard in an eggshell finish. In this example, a color sample or a color chip in semi-gloss finish [uncorrected] is prepared and the prepared semi-gloss chip/sample is compared to the maintained color standard in a different gloss. The spectral reflectance values of the standard and the uncorrected color sample, which can be measured by a spectrophotometer, are shown below.

| Wavelength (nm) | Standard | Uncorrected |
| --- | --- | --- |
| 360 | 5.95 | 6.02 |
| 370 | 6.70 | 7.20 |
| 380 | 7.37 | 8.70 |
| 390 | 8.37 | 10.83 |
| 400 | 9.10 | 12.54 |
| 410 | 9.22 | 12.95 |
| 420 | 9.13 | 12.82 |
| 430 | 9.07 | 12.63 |
| 440 | 9.01 | 12.48 |
| 450 | 8.97 | 12.39 |
| 460 | 8.93 | 12.31 |
| 470 | 8.93 | 12.26 |
| 480 | 8.91 | 12.21 |
| 490 | 8.94 | 12.18 |
| 500 | 9.01 | 12.18 |
| 510 | 9.07 | 12.20 |
| 520 | 9.17 | 12.27 |
| 530 | 9.36 | 12.45 |
| 540 | 9.77 | 12.81 |
| 550 | 10.65 | 13.61 |
| 560 | 12.54 | 15.33 |
| 570 | 15.93 | 18.33 |
| 580 | 20.61 | 22.70 |
| 590 | 25.44 | 28.20 |
| 600 | 28.98 | 31.77 |
| 610 | 30.91 | 33.36 |
| 620 | 31.84 | 33.98 |
| 630 | 32.20 | 34.26 |
| 640 | 32.44 | 34.37 |
| 650 | 32.78 | 34.54 |
| 660 | 33.17 | 34.76 |
| 670 | 33.67 | 35.00 |
| 680 | 34.23 | 35.32 |
| 690 | 34.90 | 35.64 |
| 700 | 35.50 | 35.92 |
| 710 | 36.00 | 36.11 |
| 720 | 36.34 | 36.20 |
| 730 | 36.51 | 36.23 |
| 740 | 36.38 | 36.04 |
| 750 | 35.90 | 35.72 |
| 760 | 35.90 | 35.72 |
| 770 | 35.90 | 35.72 |
| 780 | 35.90 | 35.72 |

The 60° gloss value is 7.5 GU for the standard, which is slightly below the eggshell range, and is 52.1 GU for the uncorrected color sample.

The tristimulus values of the color standard can be calculated as described in ASTM E308, discussed above. Table 5.19 and equation (7) of E308 provide the weight-set of tristimulus integration. The tristimulus values under the illuminant-observer of D65-1964 10° observer of are the color standard are:

| Color Standard | Uncorrected @ semi-gloss |
| --- | --- |
| X = 19.47 | X = 21.99 |
| Y = 15.67 | Y = 18.47 |
| Z = 9.65 | Z = 13.33 |

The Gloss Correction Coefficient (GCC) of both standard and uncorrected colors are calculated, as shown below.

Standard:

$$GCC = \left(\frac{90 - Y_{std}}{90}\right)(1.10(GU)_{sample} + 1.27) \quad \text{(Eq. 2.1)}$$

$$GCC = \left(\frac{90 - 15.67}{90}\right)(1.10 * 7.5 + 1.27)$$

$$GCC = 0.8259 * 9.52$$

$$GCC = 7.86$$

-continued

Uncorrected:

$$GCC = \left(\frac{90 - 15.67}{90}\right)(1.10 * 52.1 + 1.27)$$
$$GCC = 0.8259 * 58.58$$
$$GCC = 48.38$$

The specular reflection component for the color samples are calculated as follows.
Standard:

$$R_{SP}=0.0453(GCC)+0.1892 \quad \text{(Eq. 3.1)}$$

$$R_{SP}=0.0453*7.86+0.1892$$

$$R_{SP}=0.55$$

Uncorrected:

$$R_{SP}=0.0453*48.38+0.1892$$

$$R_{SP}=2.38$$

The difference between the two $R_{SP}$s is:

$$\Delta R_{SP}=R_{SP}(\text{uncorrected})-R_{SP}(\text{standard}) \quad \text{(Eq. 5)}$$

$$\Delta R_{SP}=2.38-0.55=1.83$$

The corrections in units of percent reflectance to be made to each of the three tristimulus values of the standard to reach the corrected match are as follows. The tristimulus values of the white point $T_i$ under ASTM E308 are discussed above.

$$R_C = \frac{T_i}{100}\Delta R_{sp} \quad \text{(Eq. 6)}$$

$$R_{C,X} = \frac{94.811 * (1.83)}{100} = 1.74$$

$$R_{C,Y} = \frac{100 * (1.83)}{100} = 1.83$$

$$R_{C,Z} = \frac{107.304 * (1.83)}{100} = 1.96$$

These three corrections are added with their sign (Δ) to the tristimulus values of the standard to create the corrected target tristimulus values that would color match the color standard when both colors have different gloss.

X=19.47+1.74=21.21
Y=15.67+1.83=17.50
Z=9.65+1.96=11.61.

As expected, the XYZ values for the corrected color is different than the XYZ values for the uncorrected color, as reported above.

EXAMPLE 2

In this Example, the same medium brown color is used. Instead of making an uncorrected color sample medium brown at a different gloss and measuring the gloss of the uncorrected color sample, a target gloss value (GU) is selected. In this Example, the target gloss value is 30 GU and the gloss of the color standard remains 7.5 CU. Any value of GU other than that of the color standard can be used. The Gloss Correction Coefficient (GCC) of both standard and target glosses are calculated, as shown below.

Standard:

$$GCC = \left(\frac{90 - Y_{std}}{90}\right)(1.10GU_{sample} + 1.27) \quad \text{(Eq. 2.1)}$$

$$GCC = \left(\frac{90 - 15.67}{90}\right)(1.10 * 7.5 + 1.27)$$

$$GCC = 0.8259 * 9.52$$

$$GCC = 7.86$$

Target:

$$GCC = \left(\frac{90 - 15.67}{90}\right)(1.10 * 30 + 1.27)$$

$$GCC = 0.8259 * 34.27$$

$$GCC = 28.30$$

The specular reflection component for the color samples are calculated as follows.
Standard:

$$R_{SP}=0.0453(GCC)+0.1892 \quad \text{(Eq. 3.1)}$$

$$R_{SP}=0.0453*7.86+0.1892$$

$$R_{SP}=0.55$$

Target:

$$R_{SP}=0.0453*28.30+0.1892$$

$$R_{SP}=1.47$$

The difference between the two $R_{SP}$'s is:

$$\Delta R_{SP}=R_{SP}(\text{target})-R_{SP}(\text{standard}) \quad \text{(Eq. 5)}$$

$$\Delta R_{SP}=1.47-0.55=0.92$$

The corrections in units of percent reflectance to be made to each of the three tristimulus values of the standard to reach the target match are as follows.

$$R_C = \frac{T_i}{100}\Delta R_{sp} \quad \text{(Eq. 6)}$$

$$R_{C,X} = \frac{94.811 * (0.92)}{100} = 0.87$$

$$R_{C,Y} = \frac{100 * (0.92)}{100} = 0.92$$

$$R_{C,Z} = \frac{107.304 * (0.92)}{100} = 0.99$$

These three corrections are added with their sign to the tristimulus values of the standard to reach the target tristimulus values to be matched.

X=19.47+0.87=20.34
Y=15.67+0.92=16.59
Z=9.65+0.99=10.64

The method employed in Example 2 is a more preferred embodiment of the present invention.

EXAMPLE 3

Three paint compositions are tinted using color prescriptions comprising combinations of organic and/or inorganic color pigments to a color medium brown under D65-10° discussed in Examples 1 and 2 having the following XYZ tristimulus values.

{X, Y, Z}={19.47, 15.67, 9.65} Gloss=7.5 GU at 60°
{X, Y, Z}={21.21, 17.50, 11.61} Gloss=52.1 GU at 60°
{X, Y, Z}={20.34, 16.59, 10.64} Gloss=30 GU at 60°

Dried paint films formed from these three exemplary paint compositions would be color matched as observed by customers and color professionals.

In yet another embodiment of the present invention, a gloss meter is corrected to the gloss meter's dependency on color or on the whiteness (Y-value) of a color, as shown in Tables 1 and 2 and by equations (1) and (1.1)

$$(GU)_{wh} = m_1 \cdot (GU)_{b1} + b_1, \quad (1)$$

$$(GU)_{wh} = 1.10 \cdot (GU)_{b1} + 1.27. \quad (1.1)$$

The GU of black, the GU of white or the GU of a mid-gray can be selected as the standard One preferred way to correct the gloss meter is to use the gloss correction coefficient from equations (2) and (2.1). The tristimulus values of the target surfaces can be measured by any known means, such as a commercial spectrophotometer discussed above. A look-up table (LUT) or a regression equation correlating the measured tristimulus values and those of the color standard is stored in the inventive gloss meter's memory in order to locate or calculate the Y-component of the standard. Alternatively, the Y-component of the measured tristimulus values is used to insert into equation (2) or more preferably (2.1).

$$GCC = \left(\frac{90 - Y_{std}}{90}\right)(m \bullet (GU)_{mer} + b), \quad (2)$$

$$GCC = \left(\frac{90 - Y_{std}}{90}\right)(1.10(GU)_{mer} + 1.27) \quad (2.1)$$

The GCC value is used to adjust the gloss value of the merchandise or paint film to arrive at the corrected gloss reading.

The subscripts, such as "standard" or "merchandise." etc., used in the specification are also used in the claims for ease of references for those of ordinary skill in the art, and are not to limit the scope of the appended claims. The subscripts used in the claims shall have the meanings defined in the claims, and in the event that the claims do not further define the subscripts then the definitions in the specification control.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

APPENDIX

The tristimulus values (CIEXYZ) for the black and white paints in Table 1 are reported

TABLE 1.1

Measured Tristimulus Values for Table 1

| | Black Paints | | | | White Paints | | | |
|---|---|---|---|---|---|---|---|---|
| | Gloss | X | Y | Z | Gloss | X | Y | Z |
| 1 | 51.2 | 2.207 | 2.329 | 2.624 | 57.7 | 83.222 | 88.116 | 91.143 |
| 2 | 31.5 | 2.764 | 2.913 | 3.226 | 35.5 | 85.023 | 89.99 | 93.756 |
| 3 | 20.1 | 3.246 | 3.422 | 3.758 | 22.9 | 85.114 | 90.049 | 93.767 |
| 4 | 13.8 | 3.636 | 3.834 | 4.195 | 16.3 | 84.983 | 89.877 | 93.587 |
| 5 | 9.8 | 3.91 | 4.12 | 4.511 | 12.2 | 84.735 | 89.595 | 93.383 |
| 6 | 7.3 | 4.174 | 4.4 | 4.811 | 9.3 | 84.424 | 89.25 | 92.986 |
| 7 | 5.3 | 4.226 | 4.45 | 4.861 | 7.2 | 84.124 | 88.922 | 92.63 |
| 8 | 4.1 | 4.275 | 4.503 | 4.903 | 5.7 | 83.386 | 88.108 | 90.286 |
| 9 | 3.1 | 4.32 | 4.551 | 4.966 | 4.7 | 83.534 | 88.287 | 91.842 |
| 10 | 2.3 | 4.289 | 4.52 | 4.914 | 3.9 | 83.113 | 87.829 | 91.251 |
| 11 | 1.8 | 4.23 | 4.458 | 4.853 | 3.3 | 82.776 | 87.462 | 90.803 |

Illuminant-Observer of D65-1964 10° server;
Measurement Mode: Hemispherical Illumination Specular Component Included.

We claim:

1. A process for correcting an observed color difference between a color at a first gloss and the color at a second gloss different than the first gloss, said process comprising the steps of:
    (a) determining a whiteness correction caused by a lightness (Y-value) of the color at the first gloss;
    (b) determining a non-directional reflection correction caused by an inclusion of a first surface diffusion in readings of gloss values;
    (c) determining a specular correction caused by a difference in specular reflections from the color at the first gloss and the color at the second gloss based on the whiteness and the non-directional reflection corrections;
    (d) determining tristimulus or spectral correction based on the specular correction;
    (e) preparing corrected tristimulus values of the color at a second gloss based on step (d); and
    (f) producing a paint composition for the color at the second gloss using the corrected tristimulus values, or a color merchandise for the color at the second gloss using the corrected tristimulus values.

2. The process of claim 1, wherein step (a) comprises step (a1) of determining a lightness correlation between gloss values of a first reference color and a reference second color, wherein the first reference color has a lower Y-value than the second reference color.

3. The process of claim 2, wherein the first reference color is a black color, and the second reference color is a white color.

4. The process of claim 3, wherein the lightness correlation comprises a linear regression between the gloss values of the black color and the white color, $GU_{wh} = m_1 \cdot GU_{b1} + b_1$, wherein $GU_{wh}$ is the gloss value of black color and $GU_{b1}$ is the gloss value of black color, and $m_1$ and $b_1$ are slope and v-intercept of said linear regression.

5. The process of claim 2, wherein step (a) further comprises step (a2) of determining a gloss correction coefficient (GCC) to generalize the lightness correlation.

6. The process of claim 5, wherein the $$GCC = \left(\frac{90 - Y_{std}}{90}\right) \bullet (\text{lightness correlation}),$$

wherein $Y_{std}$ is the Y-value of the color at the first gloss.

7. The process of claim 1, wherein step (b) comprises step (b1) of determining a gloss value-specular reflection correlation between the gloss values and the specular reflections of a reference color.

8. The process of claim 7, wherein the reference color is a white color.

9. The process of claim 8, wherein the gloss value-specular reflection correlation is a linear regression between the gloss values and specular reflections, $R_{SPwh} = m_2 \cdot GU_{wh} + b_2$.

10. The process of claim 1, wherein the specular correction in step (c) is determined by $R_{SP} = m_2 \cdot GCC + b_2$, wherein $R_{SP}$ is the specular reflection, wherein $m_2$ and $b_2$ are coefficients from a linear regression between the gloss values and the specular reflection of a reference color, wherein GCC is the $$\text{gloss correction coefficient} = \left(\frac{90 - Y_{std}}{90}\right) \bullet (\text{lightness correlation}),$$

wherein $Y_{std}$ is the Y-value of the color at the first gloss, and wherein the lightness correlation comprises $(m_1 \cdot GU_{specimen} + b_1)$, wherein $m_1$ and $b_1$ are coefficient from another linear regression between the gloss values of black and white and $GU_{specimen}$ is the gloss value of the first gloss or the second gloss.

11. The process of claim 10, wherein the specular correction in step (c)=$\Delta R_{SP}$, wherein $\Delta R_{SP}$={$R_{SP}$ (the color at the second gloss)−$R_{SP}$ (the color at the first gloss)}.

12. The process of claim 11, wherein the tristimulus correction in step (d) is determined by $$R_C = \frac{T_i}{100} \Delta R_{sp}$$

wherein $T_i$ comprises the tristimulus values of a white point of an illuminant-observer standard.

13. The process of claim 12, wherein the illuminant-observer standard comprises D65/10°.

14. The process of claim 11, wherein the spectral correction in step (d) is determined by adding $\Delta R_{SP}$ to each element of the spectrum data of the color at the first gloss to produce corrected spectrum data.

15. The process of claim 14, wherein the corrected tristimulus values are calculated based on the corrected spectrum data.

16. The process of claim 1, wherein the specular correction in step (c) is determined by an equation $$R_{SP} = 0.0453 \bullet \left\{\left(\frac{90 - Y_{standard}}{90}\right)(1.10 GU_{specimen} + 1.27)\right\} + 0.1892$$

wherein $Y_{standard}$ is the Y-value of the color at the first gloss, wherein $GU_{specimen}$ is the gloss value of the first gloss or the second gloss, and wherein numerical values in said equation for the specular correction can vary within a range of ±15%.

17. The process of claim 16, wherein said numerical values can vary within a range of 10%.

18. The process of claim 17, wherein said numerical values can vary within a range of 5%.

19. The process of claim 1, wherein the color at the first gloss comprises a color standard.

20. The process of claim 19, wherein the first gloss is measured or known from the color standard and wherein the second gloss is selected by a consumer.

* * * * *